United States Patent [19]

Koczarski

[11] Patent Number: 4,678,378

[45] Date of Patent: Jul. 7, 1987

[54] ADJUSTABLE DUAL DRILL ASSEMBLY

[75] Inventor: Jack B. Koczarski, Trumbull, Conn.

[73] Assignee: United Technologies Corporation, Hartford, Conn.

[21] Appl. No.: 881,535

[22] Filed: Jul. 2, 1986

[51] Int. Cl.⁴ .................. B23B 39/18; B23B 41/00
[52] U.S. Cl. ................................. 408/46; 408/79
[58] Field of Search ............... 29/50, 54, 55; 408/42, 408/46, 53, 79, 117

[56] References Cited

U.S. PATENT DOCUMENTS

| | | | |
|---|---|---|---|
| 1,228,110 | 5/1917 | Hanson | 408/46 |
| 2,706,918 | 4/1955 | Blatt | 408/51 |
| 2,847,881 | 8/1958 | Allemann | 408/79 |
| 2,951,425 | 9/1960 | Eger | 408/79 |
| 2,963,927 | 12/1960 | Hanger | 408/79 |
| 3,526,496 | 9/1970 | Haley | 408/46 |
| 3,663,115 | 5/1972 | Vindez | 408/79 |
| 4,179,229 | 12/1979 | Kitagawa | 408/39 |
| 4,286,902 | 9/1981 | Gagliano et al. | 408/79 |
| 4,493,595 | 1/1985 | Klein | 408/46 |

FOREIGN PATENT DOCUMENTS

| | | | |
|---|---|---|---|
| 2616550 | 10/1977 | Fed. Rep. of Germany | 408/46 |
| 2692 | of 1871 | United Kingdom | 408/46 |

Primary Examiner—William R. Briggs
Attorney, Agent, or Firm—Andrew N. Parfomak

[57] ABSTRACT

An adjustable drillhead suitable for mounting on a dual bit drill gun or press is disclosed. The invention allows for variation of the spacing between two drill bits and is especially suited for use in drilling dual holes through a workpiece required for nutplates. Also disclosed are means to locate the drillhead relative to a specific location on a workpiece prior to drilling the dual holes.

4 Claims, 5 Drawing Figures

FIG. 2
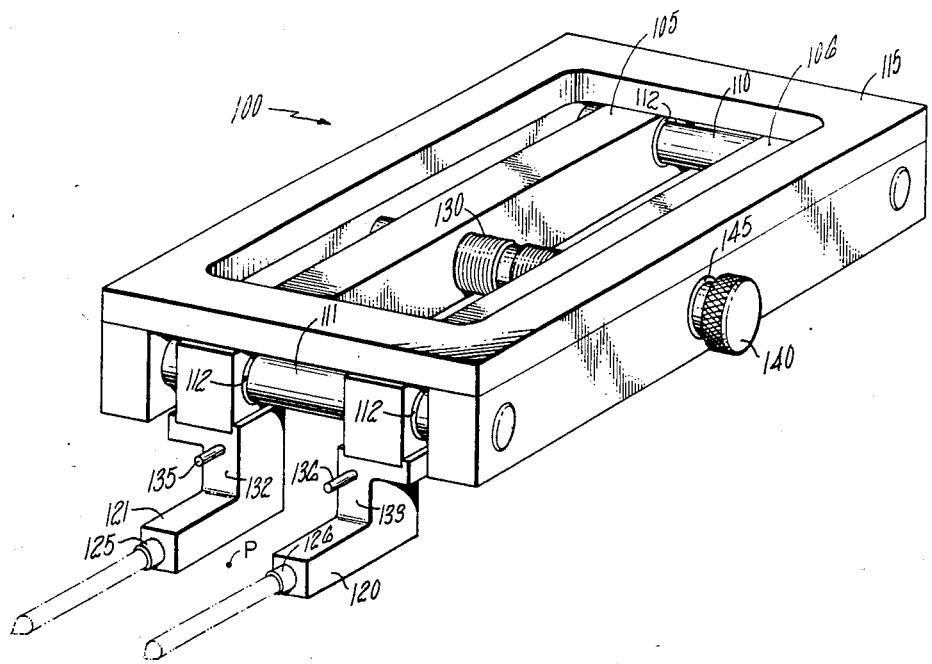
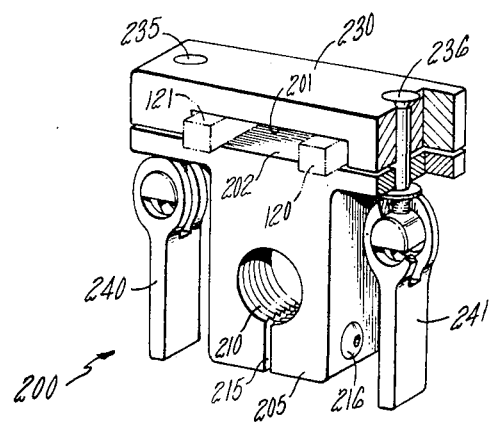
FIG. 3

FIG. 4
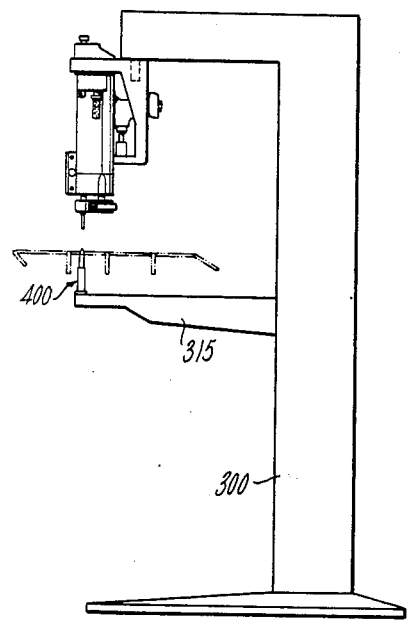
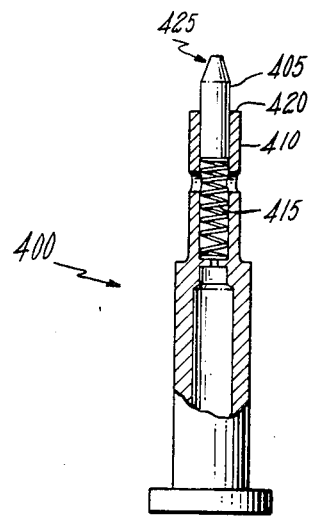
FIG. 5

ADJUSTABLE DUAL DRILL ASSEMBLY

TECHNICAL FIELD OF THE INVENTION

The invention relates to dual-bit drill guns, and more particularly to drillheads used on these drill guns.

BACKGROUND OF THE INVENTION

Nutplates are small metal plates which are frequently utilized in the fabrication of airframes as fastener components for structural members. They are available in a wide variety of sizes and configurations to suit a broad range of applications. Commonly they have three holes, one threaded ("primary") hole and two ("secondary") unthreaded holes. In use a nutplate is fastened to the back of a structural member by rivets which are engaged in the two secondary holes. Threaded fasteners passing through other structural members and engaging the primary hole in the nutplate are used to fasten structural members together.

Currently, the pattern of holes required to fasten a nutplate to the back of a structural member ° is drilled utilizing a two step process. First, a "primary" hole corresponding to the primary hole in the nutplate is drilled through the attaching member (i.e. the structural member or "workpiece", to which the nutplate will ultimately be fastened) using an ordinary drill gun. Then a dual bit drill gun is used to drill two "secondary" holes in the attaching member, corresponding to the two secondary holes in the nutplate. A guide stud protruding from the front of the dual-bit drill gun is engaged into the primary hole of the attaching member to properly orient the secondary holes to be drilled through the attaching member in relation to the primary hole of the attaching member.

In the dual-bit drill gun, the positions of the drill bits relative to one another ("secondary spacing") and to the guide stud ("primary spacing") is determined by the "drillhead". The drillhead contains rotatable shafts adapted to couple to motor driven flexible drive shafts at one end, and to hold drill bits at the other end. The drillhead is specifically fabricated for a particular nutplate configuration. This requires that there be available a separate drillhead for each nutplate configuration, which requires that the drill be removed from use to change the drillhead whenever a new hole pattern is required. Common configurations of nutplates include the "single wing" (wherein the secondary holes are colinear with and offset to one side of the primary hole), "double wing" (wherein the secondary holes are colinear with and on opposite sides of the primary hole), and so-called "Mickey Mouse" (wherein the two secondary holes are noncolinear with respect to the primary hole.

DISCLOSURE OF THE INVENTION

An object of the invention is to provide a drillhead assembly which may be adjusted to suit the particular configurations of a wide variety of nutplates.

Another object of the invention is to provide for adjustable spacing (primary spacing) between the secondary holes and the primary hole.

According to the invention, a dual-bit drill gun is provided with a drillhead which allows for variable spacing of the two rotatable shafts, and hence the two drill bits. This variable secondary spacing is provided by variable linear positioning means which keeps the two drill bits parallel to each other, allowing adjustment to suit various nutplate configurations.

The drillhead assembly is suitable to be mounted on a drill gun or drill press having two flexible drive shafts. Variable primary spacing is provided by mounting the drillhead to the stationary portion of the press and mounting the anvil to the moveable platform of the press.

Other objects, features and advantages of the invention will become apparent in light of the following description thereof.

BRIEF DESCRIPTION OF THE DRAWINGS

FIG. 2 is a perspective view of the adjustable drillhead of this invention.

FIG. 3 is a perspective view of a clamp assembly used in conjunction with the adjustable drillhead of FIG. 1.

FIG. 4 is a side view of the adjustable drillhead and clamp assembly of this invention as embodied on a stationary press.

FIG. 5 is a view of an anvil utilized in conjunction with the drillhead and footplate shown in FIGS. 3,4 in positioning a workpiece.

BEST MODE FOR CARRYING OUT THE INVENTION

Figure 1:
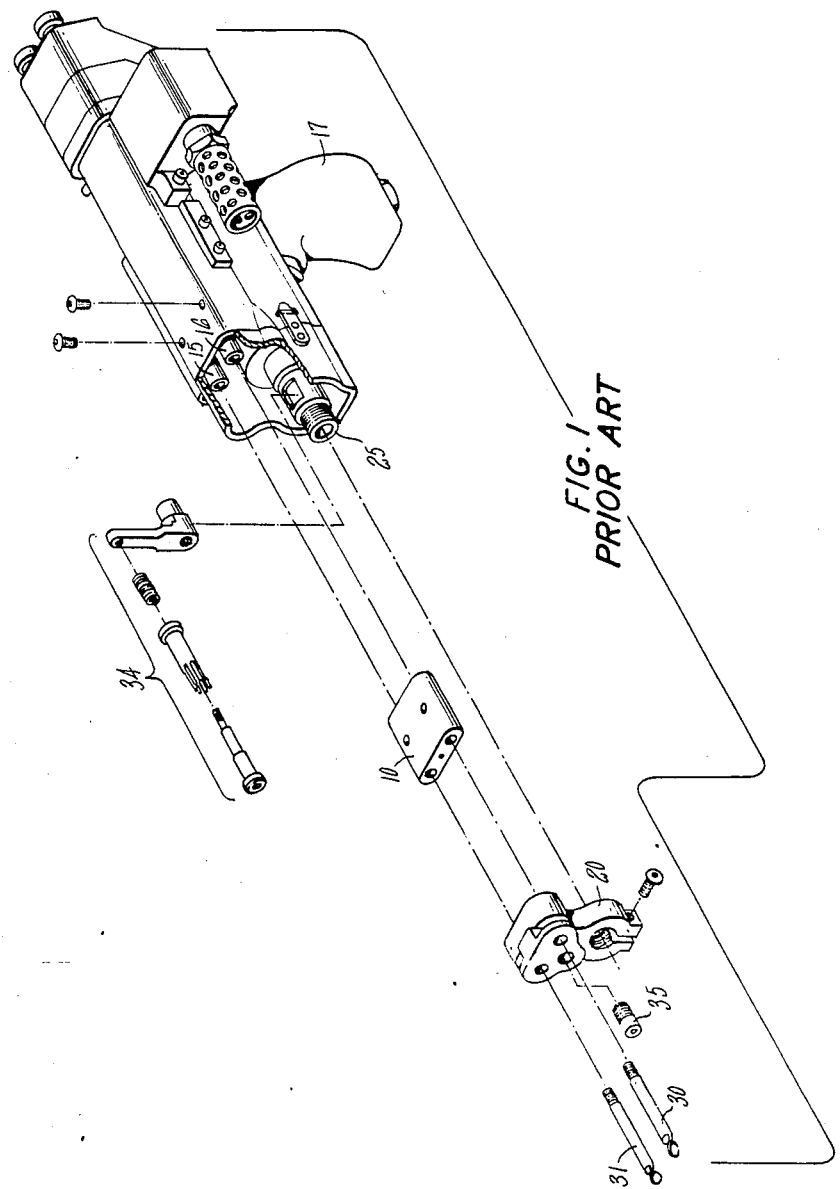
FIG. 1 is a perspective view of a prior art dual-bit drill gun.

FIG. 1 is a perspective view of the prior art dual-bit drill gun 5. A drillhead 10 suitably fastened to a drill gun 17, to receive dual drive shafts 15,16. A footplate 20 is attached to an extended fastening stud 25 of the drill gun. Two drill bits 30,31 pass through the footplate 20, through the drillhead 10 and are coupled to the drive shafts 15,16. An engaging stud 35 is fastened through the footplate 20, and to an expanding collet assembly 34. The position of the drill bits 30,31 and the engaging stud 35 establish the configuration of the holes to be drilled.

FIG. 2 is a perspective view of the adjustable drillhead 100 of this invention. As shown, two parallel spaced apart guide shafts 110,111 are fastened at their ends to a frame 115. The guide shafts 110,111 pass through holes 112 in two parallel spaced apart bars 105,106 which extend perpendicularly to the axes of the guide shafts 110,111. A threaded adjustment shaft 130 used to adjust the position on the guide shafts 110,111 of the bars 105,106 passes through a section of the bars 105,106 between the guide shafts 110,111, and is parallel to the two guide shafts 110,111. The axes of the guide shafts, 110,111, define a reference plane.

Block assemblies 120,121 are fastened below the reference plane to the front ends of the bars 105,106, so that the spacing between the bars determines the spacing between the block assemblies. Each block assembly, has a rotatable shaft 125,126, passing therethrough, wherein the orientation of the central axis of each rotatable shaft 125,126 is parallel to the reference plane. The rotatable shafts 125,126 are coupled (not shown) to the flexible drive shafts of a drill gun or press at the rear end, and are fastened to drill bits at the front end (shown in phantom). The drillhead 100 allows variation of the spacing of the drill bits relative to a fixed point "P" (which is the midpoint between the two drill bits), while keeping their axes of rotation parallel to each other and the reference plane throughout the range of adjustment.

To improve the ease of adjustability while simultaneously retaining the parallel orientation of the bars 105,106 throughout the range of adjustment, bushings or linear bearings may be utilized as sleeves for the holes 112 in the bars 105,106.

The adjustment shaft 130 is threaded with two sets of threads of equal pitch and size, but opposite in direction, each set of threads engaging one of the bars 105,106. A portion of the adjustment shaft 130 extends beyond the frame 115 where it is fastened to a knob 140. The bars are threaded to properly engage the adjustment shaft 130. Preferably, when the adjustment shaft 130 is rotated the bars 105,106 travel at an equal linear rate toward or away from one another. This allows for precise adjustment of the center-to-center spacing of the drill bits 30,31 along the guide shafts 110,111 wherein the midpoint of this spacing always coincides with the point P. Additionally, a locking collar 145 is provided to enable immobilization or permit the rotation of the adjustable shaft with respect to the frame 115. Preferably, it is of a type which provides an effective means to quickly lock the position of the threaded shaft 130 utilizing one hand, but other suitable locking means may be substituted and readily incorporated into the design.

Guide pins 135,136 are suitably positioned in each block assembly 120,121 such as a front face 132,133 thereof. The guide pins 135,136 are positioned so that their spacing remains equal to the spacing of the rotatable shafts 125,126. The guide pins 135,136 may be used with a sample nutplate to set the secondary spacing of the drill bits 30,31 by varying the space between the block assemblies 120,121 until the secondary holes of the sample nutplate engage the guide pins 135,136. Alternatively, the guide pins may be omitted and the drill bits themselves may be in a similar fashion used instead of guide pins 135,136 to establish the secondary spacing for a particular locknut. Preferably the diameter of the guide pins 135,136 is equal to the diameter of the drill bits.

FIG. 3 shows the clamp assembly 200 which ultimately is clamped to the extended fastening stud 25 (see FIG. 1) of a dual-bit spindle drill gun or press, and receives the block assemblies 120,121 (shown in phantom in FIG. 2).

The footplate 200 contains two body sections, a lower body section 205 and an upper body section 230, each of which has a flat surface 202,201 which is positioned parallel to each other and to the reference plane. A space between the flat surfaces is provided for receiving the front end of the block assemblies 120,121. Lower body section 205 contains a hole 210 (whose axis is parallel to the axes of the shafts 125,126 and is of a diameter suitable to properly engage the extended fastening stud of a drill gun or press. A gap 215 in the body section 205 extends from the hole 210 to an edge of the body section 205. A screw 216 urges the gap closed, securing lower body section 205 around the extended fastening stud 25 of a drill gun or press.

An arrangement comprised of two rods 235,236 and two cam levers 240,241, positioned at the end of the upper and lower body sections 230,205 are used to urge together the flat surfaces 201,202, which acts to secure the block assemblies 120,121 in a specific position. In the preferred embodiment rod and cam lever assemblies are utilized to secure the position of the block assemblies 120,121, but other suitable securing methods may be used. This may even include the elimination of the clamping assembly 200 and incorporating securing means directly into the design of the adjustable drillhead 100.

In use, the adjustable drillhead 100 is set to a particular nutplate configuration in the following manner. The cam levers 240,241 are moved to the "open" position to allow the block assemblies 120,121 to slide freely in the space between the parallel surfaces 201,202. Next, the locking collar 145 is disengaged, allowing the knob 140 to be rotated. A sample nutplate is obtained and one of the secondary holes is engaged on one of the guide pins 135,136. Then the knob 140 is rotated to adjust the spacing until the remaining guide pin 135,136 may be engaged through the remaining secondary hole of the nutplate. The nutplate is then removed, and the cam levers 240,241 are moved to the "closed" position to urge together the flat surfaces 201,202 and to secure the position of the block assemblies 120,121. The locking collar 145 is engaged to immobilize the rotation of the adjustable shaft 130 relative to the frame 115.

The drillhead assembly is then positioned correctly in relation to the primary hole (which has been predrilled in the workpiece) surface by using an engaging stud 35 (see FIG. 1) as in the prior art, or other device.

An alternative means suitable to position the drillhead assembly (which determines the placement of the secondary holes) in relation to the primary hole is shown in FIG. 4. The drillhead assembly is fastened on a dual spindle drill gun, which in turn is mounted on the stationary frame of a press 300. A platform 315 which is capable of adjustments in two axes in a plane perpendicular to the drill bits is positioned beneath the drill gun. An anvil 400, or other suitable device for engaging the primary hole in a workpiece is mounted on the platform 315. By varying the horizontal position of the platform 315, the position of the drill head assembly with respect to the primary hole in a workpiece may be established. This manner of mounting the drillhead assembly and the anvil 400 provides the ability to vary the location of the primary hole with respect to the secondary holes. This allows for the primary and the secondary holes drilled in a workpiece to be either colinear or noncolinear, in order to accommodate the single wing, the double wing and the Mickey Mouse type nutplates.

One suitable device to engage a variety of primary holes with different diameters is depicted in FIG. 5. An anvil 400 has a rod 405 which has a generally conical end 425. The rod 405 is slideably positioned within a sleeve 420, and a spring 415 within the sleeve and beneath the rod 405 is used to keep the conical end of the rod 405 in a position extended beyond the end of the sleeve 410. In use, the primary hole in a workpiece is engaged on the conical section of the rod 405 and the workpiece is pushed so as to compress the spring 415, bringing the workpiece in contact against the end of the sleeve 420. This positions the workpiece in preparation for drilling the secondary holes.

It is to be understood that specialized cutters may be substituted for the drill bits without detracting from the scope or object from the invention.

Further, it should be understood that the invention may also be utilized in a drill press where dual flexible drive shafts may be coupled to the rotatable shafts 125,126 of the drillhead 100, and that the orientation of the invention is inconsequential in regard to its function.

I claim:

1. An assembly for a dual-bit drillgun having two flexible drive shafts and for drilling two holes spaced relative to a primary hole in a workpiece comprising:
    two guide shafts (110,111);

two bars (105,106) mounted on said guide shafts and movable relative to each other;

two block assemblies (120,121) attached to each of said two bars (105,106);

two rotatable shafts (125,126), each shaft passing through one of said block assemblies, each shaft having means adapted to receive a drill bit at one end thereof, and to be secured to a drive shaft at the other end thereof;

a threaded adjustment shaft means (130) interconnecting said bars (105,106) for varying the spacing between the bars; and a clamp assembly (200) mounted on said drill gun and including means (204,230,235,236,240,241) for releaseably securing the block assemblies (120,121) at a selected spacing; and means for engaging the primary hole in a workpiece.

2. An assembly as in claim 1 wherein the means for engaging the primary hole extends from the front of the clamp assembly (200).

3. An assembly as in claim 1 wherein the drillhead (100) and the clamp assembly (200) are mounted on a stationary part of a press, and the means for engaging the primary hole in a workpiece is mounted on a movable part of the press which is adjustable in two axes perpendicular to the axes of the rotatable shafts (125,126).

4. An assembly as in claim 1 wherein the means for engaging the primary hole in a workpiece is an anvil assembly (400) with a generally conical end.

* * * * *